April 18, 1933.  N. R. LILLIG  1,903,785
METHOD OF MANUFACTURING LOCK WASHERS
Filed May 21, 1931
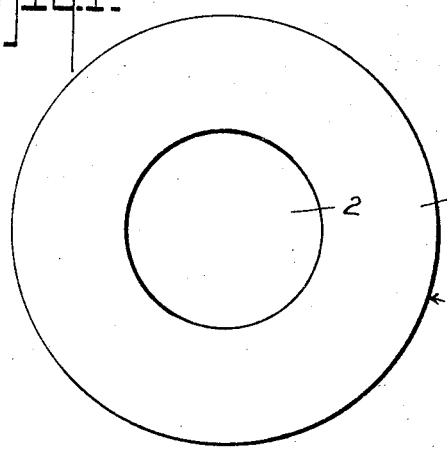
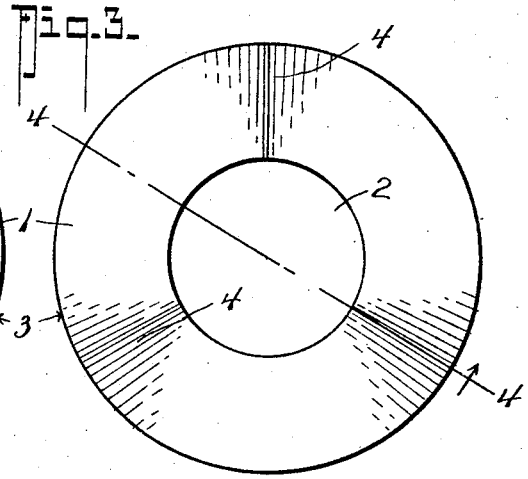
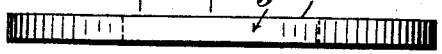
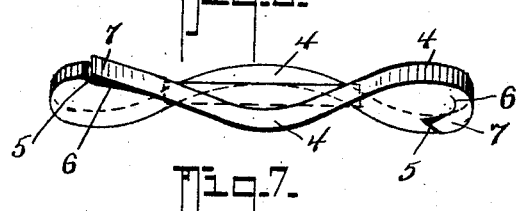
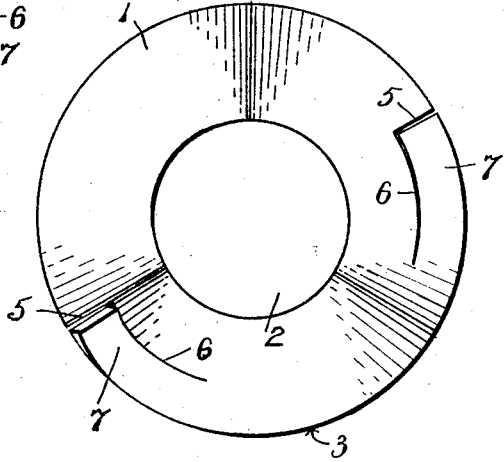
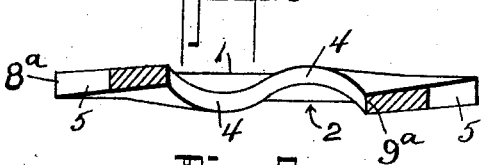
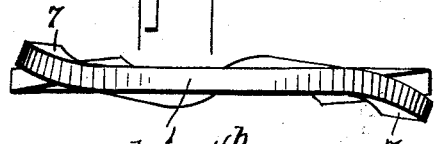
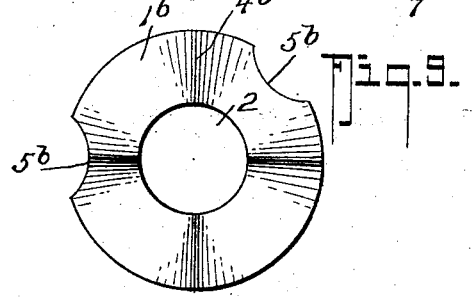
Inventor
Nicholas R. Lillig
By Albert E. Dieterich
Attorney Patented Apr. 18, 1933

1,903,785

UNITED STATES PATENT OFFICE

NICHOLAS RICHARD LILLIG, OF PORTLAND, OREGON, ASSIGNOR TO TICE LOCK-WASHER MANUFACTURING CO., OF PORTLAND, OREGON, A CORPORATION OF OREGON

METHOD OF MANUFACTURING LOCK WASHERS

Application filed May 21, 1931. Serial No. 539,099.

The present invention relates to the manufacture of undulated lock washers and it particularly has for its object to provide a simple and effective way of making washers of a particular kind so that they will maintain their molecular strength and resiliency over a long period of time.

More specifically the invention has for its object to provide an improved method of manufacturing lock washers such as those disclosed in my application filed November 24, 1930, Serial No. 497,904 (of which the present application is a continuation in part) and my application filed Feb. 28, 1931, Serial No. 519,188 of Patent No. 1,821,132.

In the drawing:

Figure 1 is a plan view of a washer blank which has been stamped from soft (annealed) sheet metal.

Figure 2 is an edge view of the same.

Figure 3 is a plan of the blank after the undulations have been formed therein.

Figure 4 is a central vertical cross section of the structure shown in Figure 3.

Figure 5 is a plan of the finished washer.

Figure 6 is an edge view of the same.

Figure 7 is a central vertical section of a washer in which the undulations are more pronounced adjacent the hole than at the perimeter of the washer.

Figure 8 is an edge view of the same.

Figure 9 is a plan of another form of washer made by my present method.

In manufacturing the washers of the types disclosed, a blank is stamped or cut from suitable soft (annealed) sheet metal having a substantially uniform gauge, (Figures 1 and 2). The blank thus formed has a definite overall diameter and a hole of a definite diameter, which diameters are to be maintained throughout the succeeding steps of manufacture.

The blank thus formed is then placed in a die press having suitable dies to hold the metal against spreading radially (which radial spreading would alter the overall diameter and that of the hole) and the metal is pressed to put in the undulations without substantially increasing the overall diameter or that of the hole. The press which forms the undulations stretches the metal of the blank in an annular direction around the hole.

When washers of the kind disclosed in my application Serial No. 497,904 aforesaid are to be produced, the dies of the die press are so cooperatively formed that the greatest squeeze is given at the perimeter or outer edge of the washer, thereby producing a washer whose body, in cross section (Figure 4), is thicker adjacent the hole and progressively thinner toward the periphery. When, however, a washer such as is disclosed in my other application aforesaid is to be made, the dies are so shaped as to give the greatest squeeze adjacent the hole, thereby making the washer thinner in cross section adjacent the hole than at the periphery.

After the washer has thus been undulated it is slit to form locking tongues, or the slits may be accomplished by the same dies that produce the undulations. After the undulations (or slits) have been produced in the blank it is then hardened or tempered so as to acquire its proper resiliency and to provide against the metal being displaced when the washer is in use.

In the drawing, the blank is indicated by 1, the hole by 2, the periphery of the washer by 3, the undulations by 4, the slits by 5 and 6 and the locking tongues or lugs by 7.

The thicker portion of the washer at the hole (Figures 1 to 6 inclusive) is indicated by the reference numeral 8 (Figure 4) and the thinner portion by 9, whereas in the washer shown in Figures 7 and 8 the thicker part of the metal is indicated by 8a and the thinner part by 9a.

In practising my method it is possible to provide washers whose holes and overall diameters are kept constant and uniform for all washers regardless of slight variation in the gauge of the plate from which the washer blanks may be stamped. This is an important feature of the invention.

In Figure 9 is shown another form of washer which may be made by this method. In that figure notches 5b are cut in the edge of the body 1b one at a high place of the undulations 4^b and another at a low place between two high places of the undulations.

As the mechanical construction, shape, form, etc. of the washers constitute the subjects matter of the applications aforesaid, it is not thought necessary to dwell on the advantages of the particular washers, in this specification.

What I claim is:

1. The method of manufacturing lock washers which consists in taking an annealed sheet metal blank of substantially uniform gauge and cutting therefrom a metal blank having a central bolt hole surounded by an annular body of uniform thickness and of a definite overall diameter, forming undulations in said body without substantially changing the overall diameter of the blank or that of the hole and thereby "stretching" the metal of the blank in an annular direction.

2. The method of manufacturing lock washers which consists in taking an annealed sheet metal blank of substantially uniform gauge and cutting therefrom a metal blank having a central bolt hole surounded by an annular body of uniform thickness and of a definite overall diameter, forming undulations in said body without substantially changing the overall diameter of the blank or that of the hole and thereby "stretching" the metal of the blank in an annular direction, and applying greater stretch along one edge of the blank body than along the other, thereby to provide a body having its greatest thickness at one edge and its least thickness at the other edge and thereafter hardening the blank, substantially as specified.

3. The method of manufacturing lock washers which consists in taking an annealed sheet metal blank of substantially uniform gauge and cutting therefrom a metal blank having a central bolt hole surounded by an annular body of uniform thickness and of a definite overall diameter, forming undulations in said body without substantially changing the overall diameter of the blank or that of the hole and thereby "stretching" the metal of the blank in an annular direction, and applying greater stretch along one edge of the blank body than along the other, thereby to provide a body having its greatest thickness at one edge and its least thickness at the other edge, and slitting the annular body with meeting slits to produce tongues adjacent the periphery of the body, and thereafter hardening the metal of the body, substantially as described.

4. The method of manufacturing lock washers which consists in taking an annealed metal blank disk having a central bolt hole surrounded by an annular body of uniform thickness throughout, said disk being of a definite overall diameter, forming undulations in said annular body without substantially changing the overall diameter of the disk or the diameter of the hole and thereby "stretching" the metal in an annuar direction, the greatest stretch taking place at the periphery and the least at the hole, and thereafter hardening the blank, substantially as described.

5. The method of manufacturing lock washers which consists in taking an annealed metal blank disk having a central bolt hole surrounded by an annular body of uniform thickness throughout, said disk being of a definite overall diameter, forming undulations in said annular body without substantially changing the overall diameter of the disk or the diameter of the hole and thereby "stretching" the metal in an annular direction, the greatest stretch taking place at the periphery and the least at the hole, and slitting the annular body with meeting radial and longitudinal slits to produce tongues adjacent the periphery of the body, and thereafter hardening the metal substantially as described.

6. The method of manufacturing lock washers which consists in taking an annealed sheet metal blank of substantially uniform gauge and cutting therefrom a metal blank having a central bolt hole surrounded by an annular body of uniform thickness and of a definite overall diameter, forming undulations in said body without substantially changing the overall diameter of the blank or that of the hole and thereby "stretching" the metal of the blank in an annular direction, and notching the edge of said body.

7. The method of manufacturing lock washers which consists in taking an annealed sheet metal blank of substantially uniform gauge and cutting therefrom a metal blank having a central bolt hole surrounded by an annular body of uniform thickness and of a definite overall diameter, forming undulations in said body without substantially changing the overall diameter of the blank or that of the hole and thereby "stretching" the metal of the blank in an annular direction, and notching the edge of said body with notches one at a high place and another at a low place of the undulations.

NICHOLAS RICHARD LILLIG.